United States Patent Office 3,191,676
Patented June 29, 1965

3,191,676
USE OF PHOSPHATES IN A WATER-FLOODING PROCESS
H Robert Froning, Tulsa, Okla., assignor to Pan American Petroleum Corporation, Tulsa, Okla., a corporation of Delaware
No Drawing. Filed Nov. 14, 1962, Ser. No. 237,742
13 Claims. (Cl. 166—9)

This invention relates to waterflooding of oil-bearing formations. More particularly it relates to operations in which phosphates are added to the flooding water to improve oil recovery.

From some time there has been laboratory evidence that if a core of certain oil-bearing formations is flooded with water, the presence of at least some types of phosphates in the water increases the amount of oil which can be recovered from the core. These same laboratory tests have also shown, however, that the phosphates are lost rapidly from the water. This might be expected since there is evidence that the phosphates act principally by changing the properties of the rock surface, converting them from an oil-wet to a water-wet condition even though initially they may have been preferentially oil wettable. In order to affect the rock surfaces it seems reasonable that some of the phosphates must be adsorbed on the rock or react with the rock and thus lost from the flooding water. In the field, the flooding water must travel several hundred feet from the injection to the producing wells. Here, as in the laboratory, strong adsorption of phosphate on rock surfaces causes loss of the phosphate before it has traveled more than a few feet from the injection well. Thus, the phosphate affects only a very small portion of the reservoir.

An object of this invention is to cause phosphates to move through the formation in waterflooding operations without excessive loss of the beneficial action of the phosphates. Obviously, there is little point in preventing adsorption of the phosphates if this destroys the ability of the phosphates to improve oil recovery. Other objects will be apparent from the following description and claims.

I have now found that if water-soluble carbonates of the alkali metals or ammonium are used in combination with phosphates, the loss of phosphates is greatly reduced. The combination still changes the wettability of the formation and thus improves oil recovery, however. The reason for the action is not completely understood. There are several theories, none of which seems entirely satisfactory.

Considering first the loss of phosphate to the formation, a test was made which shows this very well. A 100 milliliter burette was filled with 100 grams of crushed limestone. The limestone particles were within the range passing a number 20 and being retained on a number 50 sieve of the U.S. Standard Sieve Series. The limestone was taken from the Oologah limestone formation where it outcrops near Tulsa, Oklahoma. A 250 milliliter volume of a 0.1 molar aqueous solution of sodium phosphate at a pH of about 6 was circulated through the limestone for 24 hours. The circulation rate was from about 0.5 to about 1.0 liter per hour. Analysis of the solution at the end of the test showed that about 54 percent of the phosphate had been lost. The test was repeated using ammonium phosphate with about the same results.

When the tests were repeated at different pH ranges, it was found that the loss ranged from about 50 to about 55 percent at a pH of 6 to a loss of only about 20 to 25 percent at a pH of 9.

Concentration of the phosphate salt also seemed to have considerable effect. At higher concentrations the total weight of phosphate lost to the crushed limestone was considerably greater, but the percentage loss was less. For example, the loss of phosphate from a 1 molar ammonium phosphate solution at a pH of about 8 was only about 7 percent. It will be apparent that even at high concentrations the loss, even on a percentage basis, is undesirably high.

When sodium carbonate or ammonium carbonate was added to the circulated solution, loss of phosphate ranged between about 3.0 and about 0.5 percent depending on the pH, phosphate concentration, and ratio of carbonate to phosphate. The decrease in loss of phosphate is apparent from these tests.

To check these results and obtain a better idea of the proper ratio of carbonate to phosphate, three tests were made in stainless steel tubes 1 inch in diameter and 9 feet long packed with the 20 to 50 mesh crushed limestone previously described. In each test a 0.1 molar aqueous solution of $(NH_4)_2HPO_4$ was caused to flow at a rate of about 2 feet per day. In one test the solution was 0.4 molar with respect to $Na_2CO_3$. In another it was 0.04 molar with carbonate while the solution introduced in the third test contained no added carbonate. The effluent streams from the tests were analyzed for phosphate content. Flow was continued in each case until the phosphate concentration of the effluent reached a substantially steady value. The results are presented in Table I.

Table I

| Test | $Na_2CO_3$ Concentration | pH of Injected Solution | Ratio Phosphate Out to Phosphate In |
|---|---|---|---|
| 1 | 0.4 Molar | 9.9 | 1.00 |
| 2 | 0.04 Molar | 8.5 | 0.85 |
| 3 | None | 7.9 | 0.62 |

It will be apparent that in order to avoid excessive loss of phosphate, the concentration of carbonate should be at least about as high as the concentration of phosphate on a molar basis. Preferably, the concentration of carbonate should be somewhat higher than that of the phosphate. Obviously, there is little point in using a carbonate-to-phosphate ratio of more than about 4 to 1 with the 0.1 molar phosphate. For higher concentrations of phosphate the carbonate-to-phosphate ratio does not need to be quite as high. For example, the ratio may be as low as about 0.3 to 1 for a 1 molar phosphate solution. Preferably the ratio should be at least about 0.5 to 1.

Two additional points should be noted in connection with the data of Table I. First, although there was no sodium carbonate in the solution introduced in the third test, there was considerable carbonate ion in the water coming out of the column, the concentration reaching a value of about 0.05 molar.

The second point in connection with the tests reported in Table I concerns the first test. In this test a batch of water about 0.2 molar with respect to sodium carbonate but containing no phosphate preceded the phosphate-carbonate solution through the core. The very high phosphate recovery was probably due in part to this pretreatment and indicates that for best results in field operations a slug of sodium carbonate solution preceding the phosphate solution may be advisable.

The test described above establish the ability of the water-soluble carbonates to decrease the loss of phosphates to limestone and cause the phosphates to move on through the formation. This leaves the question whether the phosphate will still perform its function of improving oil recovery in the presence of the carbonate. To answer this question, two tests were made in tubes packed with crushed limestone as described above, except that the particles were in the 50 to 200 mesh range. Crude oil from the Empire Abo field was circulated through these tubes. This particular oil was selected for two reasons. First, it was known that the crude oil contains constituents which make limestone surfaces preferentially oil wettable. Second, it was known from previous tests that phosphates would convert these preferentially oil-wettable surfaces to a preferentially water-wettable condition. In addition, flow tests had shown that phosphate solutions displaced more oil than water alone would displace when the Empire Abo crude oil was employed.

In one of the two tests to determine oil recovery, the oil was displaced with distilled water until the water-to-oil ratio reached a value of about 20. An aqueous solution 0.5 molar with $(NH_4)_2HPO_4$ and 0.5 molar with $Na_2CO_3$ was then injected. The water alone displaced about 75 percent of the oil. The treated water then displaced an additional 13 percent to bring the total displaced oil to a value of 88 percent.

In the other test the oil was also first displaced with distilled water. In this case oil recovery with water alone was only 62 percent. The lower value in this case was due to differences in contact time between the oil and crushed limestone, differences in the sizes and shapes of the limesone packs, and differences in the volumes and rates of circulation of the crude oil. After the water-to-oil ratio reached a value of about 20 in this test, an aqueous ammonium carbonate solution of 0.6 molar strength was injected. An additional 11 percent of oil was displaced by the carbonate before oil recovery again substantially stopped. This brought the total oil recovery to 73 percent. Finally, an aqueous solution 1.0 molar in $Na_2HPO_4$ was displaced into the pack by the carbonate solution. The volume of this solution was equal to about 0.4 pore volume. It was followed by additional carbonate solution. The phosphate solution displaced an additional 5 percent of oil, bringing the total to about 78 percent.

The first test demonstrates the ability of the carbonate-phosphate solution to recover more oil than is recovered by water alone. The second test shows the improved results which carbonates alone often provide and then establishes the effectiveness of the phosphate in the presence of the carbonate to displace more oil than the carbonate alone.

The unique nature of the carbonate in effecting propagation of phosphates through limestone-containing reservoirs is shown by data in Table II. These data were obtained in tests in which 250 milliliters of a test solution were circulated for 24 hours through 100 grams of crushed limestone as previously described. In every case the solutions originally were 0.1 molar with $(NH_4)_2HPO_4$.

*Table II*

| Test | Additive | | pH | Phosphate Loss, g. $PO_4$/100 g. Limestone |
|---|---|---|---|---|
| | Type | Conc., molar | | |
| 1 | $Na_2S$ | 0.4 | 12.1 | 1.92 |
| 2 | $Na_2SO_3$ | 0.4 | 8.2 | 0.61 |
| 3 | None | | 9.0 | 0.57 |
| 4 | $NaHCO_3$ | 0.4 | 7.2 | 0.05 |
| 5 | $Na_2CO_3$ | 0.4 | 10.0 | 0.025 |
| 6 | $\{Na_2S$ | 0.6 | } 12.4 | 0.30 |
| | $\{Na_2CO_3$ | 0.4 | | |
| 7 | $(NH_4)_2CO_3$ | 0.4 | 10.0 | 0.035 |
| 8 | $\{Na_2SO_3$ | 0.6 | } 10.1 | 0.02 |
| | $\{Na_2CO_3$ | 0.4 | | |

Tests 1 and 2 when compared to Test 3 show that some salts such as sulfides actually increase the loss of phosphate to the formation. Tests 6 and 8 indicate that the presence of carbonates decreases the loss of phosphates even in the presence of sulfides and sulfites. Tests 4, 5, and 7, which employed various carbonates, are included for comparison and to show that the nature of the carbonate is not critical as long as it is water soluble. The results with sulfides were of particular interest since small amounts of sulfides are present in many oil field brines. The concentration of sulfides is rarely more than about 1/10 that used in Test 6, however, so that effects of these naturally occurring sulfides can be easily overcome by the presence of the soluble carbonates. The tests do indicate, however, that the concentrations of salts such as sulfides should be kept low.

The nature of the phosphates does not seem to be particularly important. The orthophosphates are preferred, but tests with other phosphates such as sodium tripolyphosphate, tetrasodiumpyrophosphate, and the like, indicate all the phosphates behave in a similar manner. It should be noted also that regardless of the type of phosphate used in the injection water, it will be converted to the orthophosphate form to a very substantial degree as it travels through the formation. Thus, the tests with orthophosphates probably are representative of conditions in most of a reservoir during a phosphate-carbonate flood regardless of the original nature of the phosphate.

All the tests and comments to this point have been directed to limestone reservoirs. Circulating tests with river sand containing principally quartz grains indicated that there is little loss of phosphate to such materials. Tests with crushed cores from the Gallup formation of the Cha Cha field in New Mexico, however, showed that there is some loss although the Gallup formation is classed as a sandstone. It seems that much of the intergranular matrix and cementing material in this sandstone is calcite and dolomite. It was found that the crushed Gallup sandstone contained about 12 percent of acid-soluble material. If such a percentage of calcium carbonate is distributed principally over the surfaces of sand grains in a sandstone, it is understandable that such a sandstone will behave much like a limestone formation as far as phosphate loss is concerned. The results with the crushed Gallup sand are easily explained on this basis. It will be apparent that my process is applicable to such formations as well as to those which consist substantially entirely of limestone. When reference is made to carbonate-containing formations, it will be understood, then, that the term is intended to include not only limestone, but limey sands, dolomite, and other formations containing sufficient carbonate to interfere with the propagation of phosphates through the reservoir.

In the case of sandstones which contain appreciable quantities of clay, one precaution may be advisable. The solution of carbonate and phosphate should probably be followed by a brine solution containing at least about 5,000 parts per million of sodium chloride. The reason is that the alkali metal or ammonium carbonates and phosphates will convert the clays to the alkali metal or ammonium form which may be dispersible and, therefore, may move in the formation and plug the pores of the formation. If the salinity of the following water is maintained above a value of about 5,000 parts per million, however, the clays remain substantially flocculated and do not tend to move as readily through the formation.

The limitation to carbonate-containing formations imposes some limitations on the pH of the flooding water. Limestone is capable of neutralizing acids. In the neutralizing operations, the pH of an acidic flooding water is increased. Experience as well as theory has indicated that it is impractical to maintain a flooding water pH below about 6. Therefore, in my process, solutions should be used having a pH of at least about 6. In some cases the pH may be as high as about 12 or even more. Preferably, the pH should be within the range between about 8 and about 11.

The effects of pH on the abilities of the phosphates and carbonates to alter the wettabilities of formations and thus improve oil recovery should not be ignored. For example, when Empire Abo crude oil and simulated formation water are placed in contact with a calcite crystal and the system is aged for several hundred hours, for example about 300 hours, the crystal surface is found to be preferentially oil wettable. When the simulated formation water is replaced by water containing sodium carbonate at a pH of about 11, the crystal remains distinctly preferentially oil wettable. When the pH is adjusted to about 9 with $(NH_4)_2CO_3$, however, the preferential oil wettability is decreased. The effect is weak but is sufficient to account for the increased oil recovery in one of the tests described above. The presence of phosphate with the carbonate then provides a greater degree of wettability change and still greater oil recovery.

Many formations exist which are naturally preferentially oil wettable but which become strongly preferentially water wettable upon contact with an aqueous solution of phosphate and carbonate. For example, crude oil from the San Andres formation of the Fullerton field in Texas gave contact angles of about 115 and 118 degrees when in contact with calcite crystals and water similar to connate water. When a solution 0.25 molar with ammonium carbonate and 0.1 molar with ammonium phosphate at a pH of about 8 was substituted for the naturally occurring water, however, the contact angles dropped in 4 hours to new values of about 59 and 65 degrees. The contact angles were measured by placing a drop of the crude oil between 2 calcite surfaces and moving these plates slightly as described in more detail in U.S. Patent 3,028,912 to give a water advancing contact angle. In these tests an angle greater than 90 degrees indicates the surface is preferentially oil wettable, while an angle of less than 90 degrees shows the surface to be preferentially water wettable. In the contact angles values given above, one is for the contact of the oil droplet with the upper calcite surface and one is for the contact with the lower surface.

When using crude oil from the Slaughter field in Texas, the contact angles in the presence of simulated reservoir water were about 118 and 118. In the presence of a solution of 0.25 molar ammonium phosphate and 0.25 molar ammonium carbonate at a pH of about 8.6, however, the contact angles reached values of 36 and 52 in about 8 hours. It will be apparent from these tests that in the case of both the Slaughter crude and the Fullerton crude, improved oil recovery can be expected on the basis of wettability reversal alone when the flooding water contains water-soluble carbonates and phosphates in concentrations of at least about 0.1 molar. While wettability reversal from a preferentially oil-wettable to a preferentially water-wettable condition is preferred, some improved oil recovery is possible by simply altering the wettability without reversing it. For example, a preferentially oil-wettable formation can be made less oil wettable or a preferentially water-wettable formation can be made more water wettable.

It should be noted, in addition, that carbonates and phosphates when present in the recommended concentration range affect other interfacial forces such as the interfacial tension between the oil and water or gas and water. For example, phosphates can lower the interfacial tension between water and oil. This lowering of oil-water interfacial tensions may affect oil recovery to at least some degree.

The phosphates and carbonates can also act as so-called builders with the natural surface active agents present in many crude oils to modify the action of these surface active agents. It will be apparent, then, that the beneficial actions of the combination of phosphates and carbonates is not limited to effects on the wettability of the rock surfaces. The principal preferred application of my process is to formations in which the phosphates reverse the wettability of formations, the carbonates being used principally to improve movement of the phosphates through the reservoir. The carbonates themselves frequently have some beneficial action, however, and the combinations of phosphates and carbonates mayl be, and often are, usable when neither agent alone is particularly effective. Therefore, I do not wish to be limited to the use of the combination in those cases where the phosphates alone improve oil recovery.

Certain variations in techniques are possible within the scope of my process. For example, if a formation has already been flooded with water, the oil phase may have become discontinuous. That is, the remaining oil may exist as isolated droplets in the pores or as spots on the formation surface. To re-establish oil continuity and thus permit flow of oil through the formation as the phosphate-carbonate solution advances, it may be advisable to inject a bank or batch of oil ahead of the solution. The size of the oil bank may be as little as 1 or 2 percent of the pore volume of the reservoir with the expectation that as this bank is forced through the reservoir, it will grow in volume as it picks up oil left behind by the previous flooding operation. The volume of the phosphate-carbonate flood should also ordinarily be at least about 1 percent of the pore volume expected to be flooded and preferably should be from about 2 to about 20 percent of this volume.

If a small volume is used, anticipating that this bank may become diluted and spread out in the reservoir as it advances, the concentration of phosphate should be about 1 molar with respect to phosphate calculated as $PO_4$ ion. For example, ⅓ mole of sodium tripolyphosphate per liter could be used to provide a solution 1 molar with respect to $PO_4$ ion. In some cases the concentration can even be a little higher than 1 molar. The upper limit is set principally by economics and by phosphate solubility. If a large volume of solution is injected, such as 20 or more percent of the flooded pore volume, then the phosphate concentration may be as low as about 0.05 molar with respect to $PO_4$ ions. Somewhat lower concentrations are sometimes effective but a minimum of about 0.05 molar should be observed to allow for some dilution and loss in the formation.

It has been previously noted in connection with one of the tests that a bank of carbonate solution may precede the bank containing phosphate. In another test, carbonate solution preceded and followed the phosphate solution. The carbonate following the phosphate served to displace any phosphate which may have been lost to the formation and force it to flow on through the formation. Thus, I contemplate that the phosphate solution with or without carbonate may be preceded, followed, or both preceded and followed by a bank of carbonate solution.

In dissolving the phosphate in water it is usually advisable to prepare a concentrated solution in fresh water and then dilute this stock solution to the desired degree with the flooding water to be used. This is particularly true if the flooding water is a brine containing considerable calcium ion. If the water-soluble carbonate is also added to the stock solution, it will to at least some degree protect the phosphate from the effects of the calcium ions.

If the flooding water contains magnesium salts, the use of ammonium phosphates and carbonates should be avoided to prevent precipitation of magnesium ammonium phosphate. If the amount of magnesium is small, it is possible, of course, to permit precipitation to take place. The precipitate can then be removed, by filtration, for example, if desired.

Still other special techniques and variations are possible. It will be understood that I contemplate the use of such techniques and variations as are apparent to those skilled in the art.

I claim:

1. A method for recovering petroleum from a carbonate-containing oil-bearing formation penetrated by at least one injection well and at least one producing well comprising introducing down said at least one injection well and into said formation an aqueous solution having a pH of at least about 6 and containing a water-soluble phosphate and a water-soluble carbonate, and recovering oil from said at least one producing well, the concentration of said phosphate being at least about 0.05 molar calculated as $PO_4$ and the concentration of said carbonate being sufficient to provide a molar ratio of carbonate to phosphate of at least about 0.3 to 1.

2. A method for recovering petroleum from a carbonate-containing preferentially oil-wettable oil-bearing formation penetrated by at least one injection well and at least one producing well comprising introducing down said at least one injection well and into said formation an aqueous solution having a pH of at least about 6 and containing a water-soluble phosphate and a water-soluble carbonate, and recovering oil from said at least one producing well, said phosphates being selected from the group consisting of salts of ammonium and akali metals and the concentration of said phosphate being within the range of from about 0.05 to about 1.0 molar calculated as $PO_4$, said carbonates being selected from the group consisting of salts of ammonium and alkali metals, and the concentration of said carbonate being sufficient to provide a molar ratio of carbonate to phosphate within the range from about 0.5 to 1 to about 4 to 1.

3. In a method of waterflooding a carbonate-containing oil-bearing earth formation penetrated by at least one injection well and at least one producing well in which method a phosphate is included in the flooding water to increase oil recovery from said producing well, the improvement comprising the addition to said water before it is injected into said at least one injection well of sufficient of a water-soluble carbonate to provide a molar ratio of carbonate to phosphate of at least about 0.3 to 1, and sufficient carbonate being added to provide a pH of at least about 6 in said water.

4. In a method of waterflooding a carbonate-containing preferentially oil-wettable oil-bearing formation penetrated by at least one injection well and at least one producing well in which method a phosphate is included in the flooding water to reverse the wettability and increase oil recovery from said producing well, the improvement comprising adjusting the pH of the flooding water to a value of at least about 6, employing as said phosphate a water-soluble salt selected from the group consisting of ammonium and alkali metal phosphates, using said phosphate in a concentration range from about 0.05 to about 1.0 molar calculated as $PO_4$, adding to said water before it is injected into said at least one injection well a water-soluble carbonate selected from the group consisting of ammonium and alkali metal carbonates, and using said carbonate in a concentration sufficient to provide a molar ratio of carbonate to phosphate in the range from about 0.5 to 1 to about 4 to 1.

5. In a method of waterflooding a preferentially oil-wettable oil-bearing carbonate-containing earth formation in which flooding water is introduced into said formation through an injection well and oil is produced from said formation through a producing well, and in which the presence of a phosphate in the flooding water is capable of reducing the oil wettability of said formation and thus improving oil recovery, the improvement comprising adding to said water from about 0.05 to about 1.0 mole of a water-soluble phosphate per liter of said water to reduce oil wettability and sufficient of a water-soluble carbonate to provide a molar ratio of carbonate to phosphate within the range of from about 0.5 to 1 to about 4 to 1 to increase the propagation of said phosphate through said formation, and sufficient carbonate being added to provide a pH of at least about 6 in said water.

6. The method of claim 5 in which said phosphate is selected from the group consisting of ammonium and alkali metal phosphates and said carbonate is selected from the group consisting of ammonium and alkali metal carbonates.

7. A method for recovering petroleum from a carbonate-containing oil-bearing formation penetrated by at least one injection well and at least one producing well comprising introducing down said at least one injection well and into said formation an aqueous solution containing a water-soluble carbonate in a molar concentration of at least about 0.05, then injecting down said at least one injection well and into said formation an aqueous solution having a pH of at least about 6 and at least about 0.05 molar with a water-soluble phosphate, the phosphate being calculated as $PO_4$, and recovering oil from said at least one producing well.

8. The method of claim 7 in which the phosphate solution also contains a water-soluble carbonate in a concentration sufficient to provide a molar ratio of carbonate to phosphate of at least about 0.3 to 1.

9. A method for recovering petroleum from a carbonate-containing oil-bearing formation penetrated by at least one injection well and at least one producing well comprising introducing down said at least one injection well and into said formation an aqueous solution having a pH of at least about 6 and containing a water-soluble phosphate, the phosphate solution being at least about 0.05 molar with phosphate calculated as $PO_4$, and then injecting into said at least one injection well and into said formation an aqueous solution containing a water-soluble carbonate in a concentration on a molar basis at least about 0.5 times as greater as the concentration of phosphate in said phosphate solution, and recovering oil from said at least one producing well.

10. The method of claim 9 in which said phosphate solution also contains a water-soluble carbonate in a concentration sufficient to provide a carbonate-to-phosphate ratio of at least about 0.3 to 1.

11. A method for recovering petroleum from a carbonate-containing oil-bearing formation penetrated by at least one injection well and at least one producing well comprising introducing down said at least one injection well and into said formation an aqueous solution containing a water-soluble carbonate in a concentration of at least about 0.05 molar, next injecting into said at least one injection well and into said formation an aqueous solution having a pH of at least about 6 and containing a water-soluble phosphate, the phosphate being at least about 0.05 molar with phosphate calculated as $PO_4$, and then injecting into said at least one injection well and into said formation an aqueous solution containing a water-soluble carbonate in a concentration on a molar basis at least about 0.5 times as great as the concentration of phosphate in said phosphate solution, and recovering oil from said at least one producing well.

12. The method of claim 11 in which said phosphate solution also contains a water-soluble carbonate in a concentration sufficient to provide a carbonate-to-phosphate ratio of at least about 0.3 to 1.

13. An improved method for recovering oil from a permeable solid material characterized by being a carbonate-containing oil-bearing earth formation, said method comprising introducing into said material, through an input means, an aqueous solution having a pH of at least about 6 and containing a water-soluble phosphate and a water-soluble carbonate, and withdrawing oil from said material, through an output means, the concentration of said phosphate being at least about 0.05 molar calculated as $PO_4$, and the concentration of said carbonate being sufficient to provide a molar ratio of carbonate to phosphate of at least about 0.3 to 1.

References Cited by the Examiner

UNITED STATES PATENTS

| | | | |
|---|---|---|---|
| 2,246,726 | 6/41 | Garrison | 166—42 |
| 2,747,670 | 5/56 | King | 166—9 |

BENJAMIN HERSH, *Primary Examiner.*

CHARLES E. O'CONNELL, *Examiner.*

UNITED STATES PATENT OFFICE
CERTIFICATE OF CORRECTION

Patent No. 3,191,676

June 29, 1965

H Robert Froning

It is hereby certified that error appears in the above numbered patent requiring correction and that the said Letters Patent should read as corrected below.

Column 1, line 14, for "From" read -- For --; line 22, for "surface" read -- surfaces --; column 3, line 26, for "limesone" read -- limestone --; column 5, line 75, for "mayl" read -- may --; column 8, line 8, after "and" insert -- being --; line 27, for "greater" read -- great --.

Signed and sealed this 15th day of February 1966.

(SEAL)
Attest:

ERNEST W. SWIDER
Attesting Officer

EDWARD J. BRENNER
Commissioner of Patents